US010306286B2

(12) United States Patent
Gupta et al.

(10) Patent No.: US 10,306,286 B2
(45) Date of Patent: May 28, 2019

(54) REPLACING CONTENT OF A SURFACE IN VIDEO

(71) Applicant: Adobe Inc., San Jose, CA (US)

(72) Inventors: Niraj Gupta, Faridabad (IN); Syed Saad Hussain, Noida (IN); Saurabh Sharma, Noida (IN); Sandesh Kumar Agrawal, Noida (IN); Morgan O. Gurfinkel, Fair Lawn, NJ (US); Jonathan David Tabak, Los Angeles, CA (US); Jens Markus Loeffler, Cranford, NJ (US); Ashish Duggal, Delhi (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 15/195,808

(22) Filed: Jun. 28, 2016

(65) Prior Publication Data
US 2017/0374403 A1 Dec. 28, 2017

(51) Int. Cl.
H04N 21/61 (2011.01)
H04N 21/81 (2011.01)
H04N 21/234 (2011.01)
H04N 21/237 (2011.01)
H04N 21/2668 (2011.01)
H04N 21/472 (2011.01)
H04N 21/2665 (2011.01)
H04N 21/258 (2011.01)

(52) U.S. Cl.
CPC ....... H04N 21/2668 (2013.01); H04N 21/237 (2013.01); H04N 21/23418 (2013.01); H04N 21/25883 (2013.01); H04N 21/2665 (2013.01); H04N 21/47205 (2013.01); H04N 21/6125 (2013.01); H04N 21/812 (2013.01)

(58) Field of Classification Search
None
See application file for complete search history.

(56) References Cited

U.S. PATENT DOCUMENTS

| 7,577,978 | B1* | 8/2009 | Wistendahl | A63F 13/12 725/109 |
| 2003/0149983 | A1* | 8/2003 | Markel | H04N 7/088 725/51 |
| 2004/0031062 | A1* | 2/2004 | Lemmons | H04N 7/17318 725/136 |

(Continued)

Primary Examiner — Nathan J Flynn
Assistant Examiner — Christen A Kurien
(74) Attorney, Agent, or Firm — SBMC

(57) ABSTRACT

Replacing content of a surface in video is described. In one or more embodiments, a surface captured in a scene of video content is replaced with replacement content. As part of doing so, an indication of the surface to be replaced is received. The indication may be received as user input to select the surface for replacement from a frame of video content or as a pattern that can be used to search for the surface in frames of the video content. Once the surface is identified, it is tracked throughout the video content using motion tracking techniques. The motion tracking identifies frames of the video content that include the identified surface as well as locations of surface in the identified frames. Based on the identified frames and locations, the replacement content is incorporated into the video content to replace the surface.

20 Claims, 7 Drawing Sheets

(56) References Cited

U.S. PATENT DOCUMENTS

| | | | | |
|---|---|---|---|---|
| 2008/0246759 A1* | 10/2008 | Summers | ............. | G06F 3/0304 |
| | | | | 345/420 |
| 2012/0278823 A1* | 11/2012 | Rogers | ................... | H04N 7/162 |
| | | | | 725/5 |
| 2013/0031582 A1* | 1/2013 | Tinsman | ............ | H04N 21/2353 |
| | | | | 725/36 |

* cited by examiner

REPLACING CONTENT OF A SURFACE IN VIDEO

BACKGROUND

Advances in media delivery technologies allow users to playback most media content "on-demand", e.g., at a specific time the user requests to playback the content. By playing back media content on-demand, for instance, users can watch television broadcasts at times that are convenient for them rather than when actually broadcast. On-demand playback is enabled by technologies such as digital video recorders (DVRs). One issue with such technologies is that some of the technologies allow users to skip advertisements, e.g., by fast-forwarding through commercial breaks. While doing so may be convenient for users, advertisers often pay significant sums of money to have their advertisements included in the media and want users to be exposed to the advertisements.

Further, some media content may not have many breaks for advertisements, if any. Thus, the number of advertisements that can be shown during dedicated breaks, in connection with such content, is limited. In soccer, for example, halves of continuous action last forty-five minutes. During these halves, there are no breaks that last a predetermined amount of time though. Consequently, soccer games do not provide opportunities for commercial breaks to show a predetermined number of advertisements at regular intervals. Rather, in connection with soccer games, commercial breaks may be inserted before a game, between halves, and after the game. By having breaks solely at these times, however, the number of opportunities (in terms of commercial breaks) for advertisers to expose users to advertisements in connection with broadcast soccer is limited.

Due to these issues, techniques have been developed for ensuring that users are exposed to advertising in connection with consuming media content. Some such techniques include prohibiting users that watch on-demand content from skipping advertisements (e.g., by prohibiting a user from fast-forwarding through a commercial break), overlaying advertising content over video media content (e.g., on a field during a live broadcast of a sporting event), and so forth. However, these conventional techniques have a variety of different drawbacks. For example, prohibiting advertisements from being skipped can annoy users because they may prefer to watch the content without having to watch the advertisements. Traditional pre-roll and mid roll advertisements disrupt users' content viewing experiences, for instance. Another technique for exposing users to advertisements is to overlay advertisements onto primary video content. However, overlays can distract users from the primary video content. Additionally, conventional techniques for overlaying advertisements may require expensive recording hardware and/or client-side processing hardware. Due to such drawbacks, conventional techniques for ensuring advertisement exposure in connection with media content viewing may not result in an ideal consumption experience for users.

SUMMARY

Replacing content of a surface in video is described. In one or more embodiments, a surface captured in a scene of video content, e.g., a sign, a wall, a display, and so on, is replaced with replacement content, such as an advertisement. As part of doing so, an indication of the surface to be replaced is received. The indication may be received as user input to select the surface for replacement from a frame of the video content. The indication may also be received as a pattern that can be used to search for the surface in frames of the video content. Once the surface to be replaced is identified, the surface is tracked throughout the video content using motion tracking techniques. The motion tracking identifies frames of the video content that include the identified surface as well as locations of the surface in the identified frames. Based on the identified frames and the locations within those frames, the replacement content is incorporated into the video content. In particular, the replacement content is incorporated to replace the surface.

In some cases, incorporation of the replacement content based solely on the motion tracking can result in a situation where the replacement content appears to "shake" when the video content is played back. Accordingly, content stabilization techniques may be applied to reduce or remove the shaky appearance of the replacement. In particular, the replacement content may be stabilized using content warping techniques that are capable of warping pixels of the replacement content and pixels of the frames into which the replacement content is incorporated. Replaced-surface video content is generated in accordance with the incorporating and the stabilizing. When played back for viewing by a user, the replaced-surface video content is configured to expose the replacement content in place of the surface. These techniques can be implemented by a web-based surface replacement service to offload a computing burden attendant to replacing the surfaces from client devices used to playback the video content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 7 illustrates an example system including various components of an example device that can be employed for

DETAILED DESCRIPTION

Overview

Figure 1:
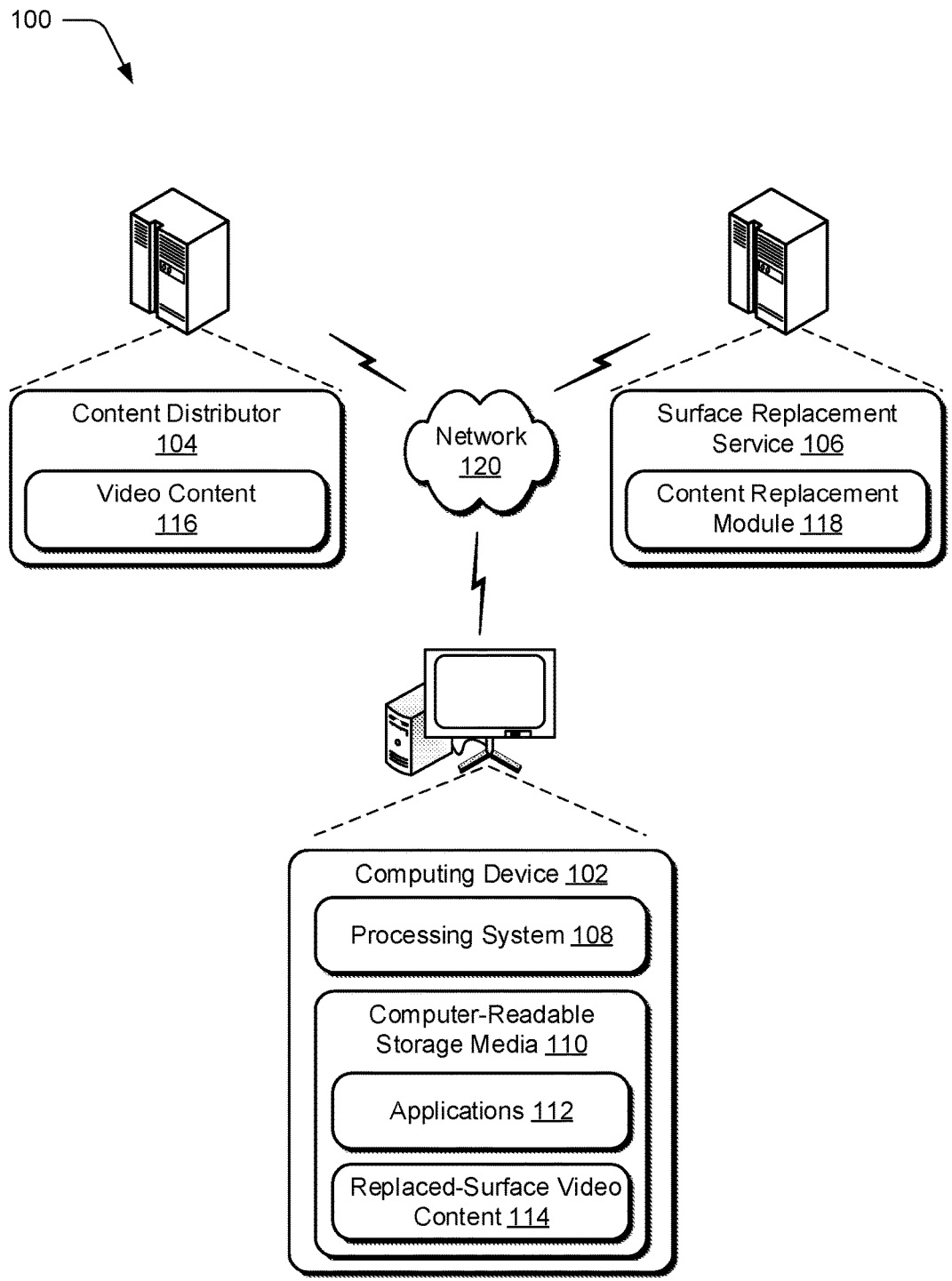
FIG. 1 is an illustration of an environment in an example embodiment that is operable to employ techniques described herein.

Replacing content of a surface in video is described. In one or more embodiments, surfaces in primary video content are identified that can be replaced with other content, e.g., secondary content. As used herein, "primary video content" refers to video media content that is the focus of the playback or broadcast. By way of example and not limitation, primary video content can include television shows, movies, recordings of sporting events, recordings of cultural events, and so on. In contrast, "advertising content" refers to content from advertisers that is inserted in the primary video content, e.g., as video clips during commercial breaks, as image content overlaid on portions of the primary video content, and so on. Advertising content may be considered a type of "secondary content," which refers to content from any provider (e.g., advertisement provider, original content provider, etc.) that is inserted in the primary video content. With regard to watching content "on-demand," users may simply want to skip through advertising, e.g., by fast-forwarding through commercial breaks, though some conventional techniques may not allow them to do so. As used herein, "on-demand" refers to the ability to time-shift playback of content from an original airing or broadcasting of the content to a different time, such as a time the user selects. "On-demand" can also refer to content that is maintained in a repository and delivered (e.g., streamed) to a user for consumption in response to a user selection.

As used herein, a "surface" may refer to a plane, a billboard, a flat wall, or some other object captured in video content that is capable of being adjusted to include secondary content, such as a business logo or an image. A scoreboard, captured as part of a baseball game recording, for instance, may include one or more portions that are already configured with physical signs (e.g., product or service logos), monitors that display different advertisements, and so forth. These portions of the scoreboard may be identified as surfaces that are replaceable with other content. Surfaces in a captured scene may correspond to a variety of different objects without departing from the spirit or scope of the techniques described herein.

A replaceable surface may be identified initially in a single frame of the primary video content. The replaceable surface may then be tracked throughout the video (e.g., tracked in other frames) using motion tracking. Replacement content can then be incorporated into the primary video content based on the tracking of the replaceable surface. As used herein, "replacement content" refers to secondary content that can replace a replaceable surface. Replacement content may correspond to a logo, graphic, or other image that is capable being incorporated into portions of the primary video content. Replacement content may also correspond to other video content that is capable of being incorporated into portions of the primary video content, such as a video incorporated onto a video-monitor portion of a scoreboard.

Consider further the discussion of incorporating the replacement content into the primary content, in accordance with one or more embodiments. In each frame of the video content, the replacement content can be incorporated into the primary video content at a location of the replaceable surface, e.g., as determined by the motion tracking. By way of example, the replacement content may correspond to a product or service logo configured as an image. Incorporation of the replacement content may involve replacing the pixels of primary video content that correspond to the replaceable surface with the pixels of the image that correspond to the logo.

In some instances, incorporation of replacement content based solely on motion tracking can lead to "jitters" (e.g., shaking) of the replacement content. In other words, the incorporated content may appear to shake when played back. To reduce or remove such jitters, the replacement content may be warped using one or more warping techniques. The warping may stretch or compress portions of the replacement content, or portions of the primary video content so that the replacement content does not appear to shake relative to the primary video content. Instead, application of the warping techniques causes the replacement content to appear as if it is part of the original surface that was replaced. In this way, a physical sign may be replaced with advertising from a different advertiser.

By replacing surfaces in this way, additional advertising opportunities may be made available to advertisers. For instance, the techniques used herein may be used to replace a surface in primary video content with a first advertisement over a first period of time after the primary video content is broadcast. After the first period, the surface in the primary video content may be replaced with a second advertisement for a second period of time. It may be determined that more people are likely to watch the primary video content during the first period, so a content provider may charge an advertiser more for the first advertisement. In addition to making additional advertisement opportunities available, the techniques described herein may be implemented without the expensive hardware used in some conventional techniques to overlay advertisements onto video content. Instead, the techniques described herein may implement motion tracking and warping using scripting. Additionally, the techniques described herein provide the advantage of offloading a computing burden associated with replacing surfaces in video content from client devices. The described techniques do so by leveraging a web based service (e.g., implemented using one or more server devices) for the replacing.

In the following discussion, an example environment is first described to employ the techniques described herein. Example implementation details and procedures are then described which are performable in the example environment as well as other environments. Consequently, performance of the example procedures is not limited to the example environment and the example environment is not limited to performance of the example procedures.

Example Environment

FIG. 1 is an illustration of an environment 100 in an example embodiment that is operable to employ techniques described herein. The illustrated environment 100 includes a computing device 102, a content distributor 104, and a surface replacement service 106. The computing device has a processing system 108 that includes one or more processing devices (e.g., processors) and one or more computer-readable storage media 110. The illustrated environment 100 also includes applications 112 and replaced-surface video content 114 embodied on the computer-readable storage media 110 and operable via the processing system 108 to implement corresponding functionality described herein. Video content 116 and content replacement module 118 are embodied on computer-readable storage media (not shown) of the content distributor 104 and the surface replacement service 106, respectively. In at least some embodiments, the computing device 102 includes functionality to access various kinds of web-based resources (content and services), interact with online providers, and so forth as described in further detail below.

The computing device 102, the content distributor 104, and the surface replacement service 106 are configurable as any suitable type of computing device. For example, the computing device 102, the content distributor 104, and the surface replacement service 106, may be configured as a server, a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102, the content distributor 104, and the surface replacement service 106 may range from full resource devices with substantial memory and processor resources (e.g., servers, personal computers, game consoles) to a low-resource device with limited memory and/or processing resources (e.g., mobile devices). Additionally, although a single computing device 102, content distributor 104, and surface replacement service 106 are shown, each of these depicted devices may be representative of a plurality of different devices to perform operations "over the cloud" as further described in relation to FIG. 7.

The content distributor 104 and the surface replacement service 106 are each examples of one or more service providers that are configured to communicate with computing device 102 over a network 120, such as the Internet, to provide a "cloud-based" computing environment. Generally speaking, service providers are configured to make various resources available over the network 120 to clients. In some scenarios, users sign up for accounts that are employed to access corresponding resources from a provider. The provider authenticates credentials of a user (e.g., username and password) before granting access to an account and corresponding resources. Other resources are made freely available, (e.g., without authentication or account-based access). The resources can include any suitable combination of services and/or content typically made available over a network by one or more providers. By way of example and not limitation, such services include, but are not limited to, video subscription services (e.g., Hulu®, Netflix®, and so on), video hosting services (e.g., Vimeo®, YouTube®, and so on), cable and satellite television services, and so forth. Providers of services that host or deliver content for consumption by users via a variety of devices, such as cell phones, tablets, televisions, desktop computers and so on are referred to herein generally as "content providers".

Content providers serve as sources of significant amounts of video content. The video content that content providers make available for user consumption can include a variety of different types of videos, such as television shows, movies, news, advertisements, home videos, sporting events, and other video clips. Further, this video content may be formatted in any of a variety of different formats, including but not limited to FLV, MPEG-2, MP4, WMV, MOV, and so on. Content providers and other types of service providers may also serve as sources of various applications, such as mobile and desktop applications. Applications 112 represent the applications that are accessible to a user of the computing device 102. By way of example, the applications 112 can include web browsers, media players, applications that provide specialized functionality for and access to a social networking service, and so on. The applications 112 may represent a variety of different types of applications without departing from the spirit or scope of the techniques described herein.

The content replacement module 118 of the surface replacement service 106 represents functionality to implement aspects of techniques for replacing content of a surface in video. Consider an example in which a user of the computing device 102 requests a video from the content distributor 104. The requested video may correspond to one media asset maintained by the content distributor 104 as part of the video content 116. The requested video may be communicated to the surface replacement service 106 responsive to the request, or the video may have been previously communicated to the surface replacement service 106 for surface replacement and communicated back to the content distributor 104 for communication directly to the computing device 102.

In any case, the surface replacement service 106 at some point obtains the video content 116 from the content distributor 104 that corresponds to the requested video. The surface replacement service 106 may, for instance, obtain the video content 116 via the network 120. Once obtained, the surface replacement service 106 can employ the content replacement module 118 to replace at least some replaceable surfaces of the obtained video content 116 with replacement content. As mentioned above, the replaceable surfaces in a video of a sporting event may be signs that are used to advertise products or services. Further, the replacement content may be different advertisements in the form of images that depict company logos, products, slogans, and so on. Given these examples of replaceable surfaces and replacement content, the content replacement module 118 may be employed to replace a sign captured in the video content with an image having different advertising content. It should be appreciated that the content replacement module 118 is configured to replace a variety of different replaceable surfaces with a variety of different replacement content within the spirit and scope of the techniques described herein.

To replace a replaceable surface with replacement content, the content replacement module 118 may first receive an indication of the surface in the video that is to be replaced. This indication may be user supplied, for example. A user (such as a broadcast producer or replay administrator) may, for instance, stop playback of the video content on a certain frame that captures a replaceable surface. The user may then provide an input to select the replaceable surface for replacement, e.g., by clicking on the surface, scribbling over the surface to make a scribble-selection, using a lasso tool to draw a shape around the surface, and so on. In one or more embodiments, the indication may be supplied using an image file. For example, the image file may include an image of captured content that is to be replaced, such as a logo of a good or service that appears in the video on some captured surface. The surface to be replaced may be indicated in other ways without departing from the spirit or scope of the techniques described herein.

Based on the indication of the surface to be replaced, the content replacement module 118 uses motion tracking to track the surface across multiple frames of the video content. In this way, the content replacement module 118 learns a location of the surface in each frame the surface appears. With reference back to the sporting event example, the content replacement module 118 learns a location of the sign that is to be replaced across different video frames of the sporting event. When a clip of the sporting event includes the sign, its location in the frames is detected and corresponding information generated. Due to content editing, some clips of the video content may not contain the surface to be replaced. The motion tracking may also indicate the portions of the video content that do not capture the surface to be replaced.

Based on the motion tracking, the content replacement module 118 may generate data indicating times in the video content at which the replaceable surface appears, and a location of the replaceable surface in the frames corresponding to those times. Based on the information obtained through the motion tracking, the content replacement module 118 may replace the replaceable surface with the replacement content. To do so, the content replacement module 118 incorporates the replacement content into frames of the video content in which the replaceable surface appears. In particular, the content replacement module 118 incorporates the replacement content in those frames at a location of the replaceable surface.

In one or more embodiments, the content replacement module 118 also uses warping to smooth incorporation of the replacement content. Incorporating the replacement content into the video content on a frame-by-frame basis may cause the replacement content to appear to shake relative to the original video content when the video content is played back. By warping pixels that correspond to the replacement content and/or pixels of the video content near the replacement content, the shaking can be reduced or eliminated. In other words, the replacement content appears to be "stabilized." Accordingly, the content replacement module 118 represents functionality to replace replaceable surfaces in video content with replacement content using motion tracking and warping techniques. The content replacement module 118 may then generate replaced-surface video content 114. When viewed by a viewer, the replaced-surface video content 114 shows the replacement content in place of the replaceable surface. In this way, the viewer may be exposed to different content (e.g., different advertising) than was captured as part of an original recording.

Once the replaced-surface video content 114 is generated, the surface replacement service 106 may communicate it the content distributor 104. The content distributor 104 may then deliver the replaced-surface video content 114 to the computing device 102 for playback. Alternately, the surface replacement service 106 may communicate the replaced-surface video content 114 directly to the computing device 102 for playback, e.g., stream the video content to the computing device 102 based on a request to view the content.

In one or more embodiments, the content replacement module 118 is implementable as a software module, a hardware device, or using a combination of software, hardware, firmware, fixed logic circuitry, etc. Further, the content replacement module 118 can be implementable as a stand-alone component of the surface replacement service 106 as illustrated. In addition or alternatively, the content replacement module 118 can be configured as a component of a web service, an application, an operating system of the surface replacement service 106, a plug-in module, or other device application as further described in relation to FIG. 7.

Having considered an example environment, consider now a discussion of some example details of the techniques for replacing content of a surface in video in accordance with one or more embodiments.

Replacing Content of a Surface in Video

Figure 2:
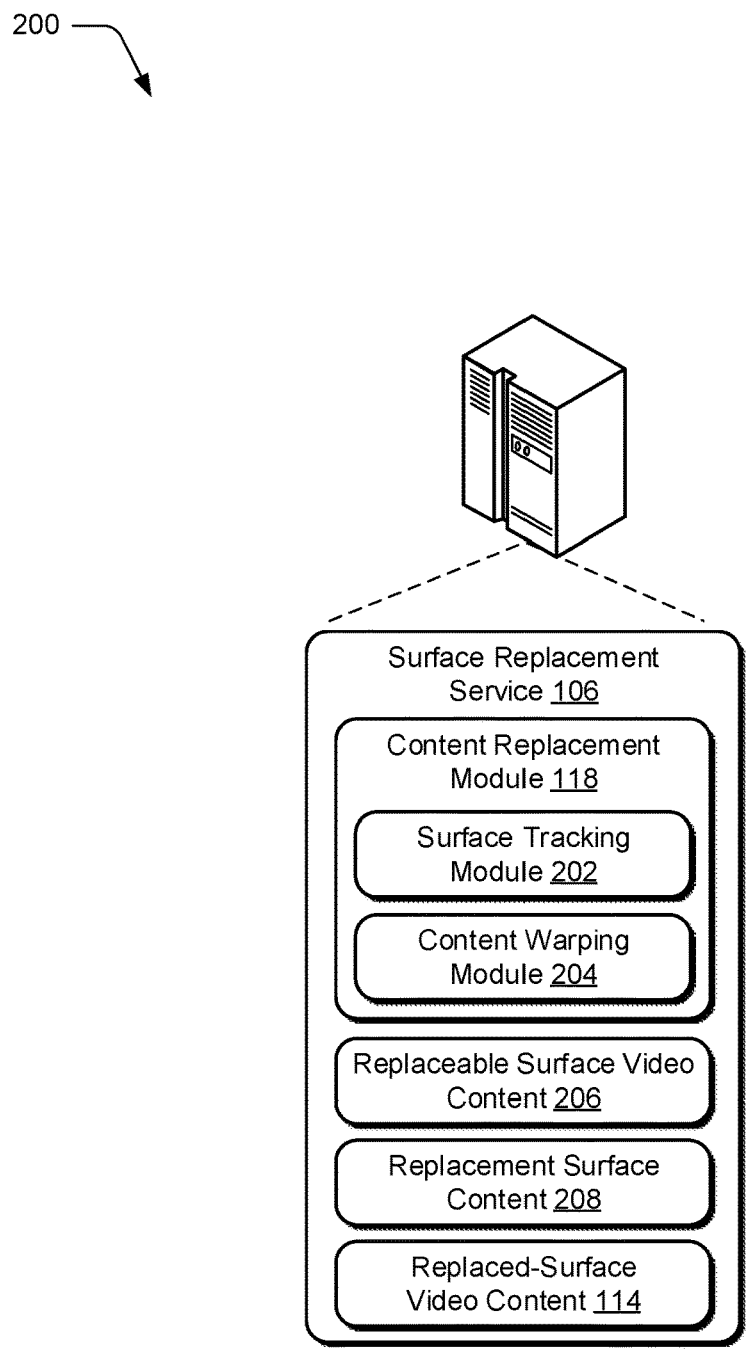
FIG. 2 illustrates portions of the environment from FIG. 1 in greater detail in accordance with one or more embodiments.

This section describes some example details of techniques for replacing content of a surface in video in accordance with one or more embodiments. FIG. 2 depicts an example embodiment, generally at 200, of the surface replacement service 106 of FIG. 1, but in greater detail. In particular, the content replacement module 118 is depicted in greater detail.

In FIG. 2, the content replacement module 118 includes surface tracking module 202 and content warping module 204. The surface replacement service 106 is also illustrated having replaceable surface video content 206, replacement surface content 208, and the replaced-surface video content 114. The content replacement module 118 may employ the surface tracking module 202 and the content warping module 204 to produce the replaced-surface video content 114 according to the techniques discussed above and below.

Broadly speaking, the replaceable surface video content 206 represents primary video content from a content distributor, such as the content distributor 104. The replaceable surface video content 206 may correspond to a broadcast of sporting event, a television show, movie, and so on. The replaceable surface video content 206 may also correspond to a sporting event, television show, movie, and so on, that is maintained for on-demand distribution. In any case, the replaceable surface video content 206 includes portions that capture surfaces capable of being replaced by other content, e.g., replacement content. For example, the replaceable surface video content 206 may capture signs, billboards, posters, displays, flat walls, building faces, and so forth. In some scenarios, the replaceable surfaces may correspond to surfaces captured in an original recording of the content. In addition or alternately, the replaceable surfaces may correspond to surfaces that have already been replaced with replacement content, and that are to be replaced again with new replacement content.

The replacement surface content 208 represents secondary content that is used to replace the replaceable surfaces of the replaceable surface video content 206. By way of example and not limitation, the replacement surface content 208 may be configured as an image, a video, a vector graphic, and so on. The replacement surface content 208 may correspond to an image file of a logo for a product or service, for example. The replacement surface content 208 may be formatted in any of a variety of different formats capable of replacing replaceable surfaces of the replaceable surface video content 206 without departing from the spirit or scope of the techniques described herein.

In accordance with the techniques described herein, the replacement surface content 208 may be viewer specific. For example, when a viewer requests video content, demographic data describing the user may be collected, e.g., from a user profile of the viewer. The collected demographic information may then be used to select which replacement surface content 208 to use for replacing the replaceable surfaces. For example, the demographic information can be used to determine which of a plurality of different marketing segments to assign to the viewer. Further, each of the marketing segments may correspond to different replacement surface content, such that a "golfers" marketing segment may correspond to replacement surface content for golf equipment, a "tennis" marketing segment may correspond to replacement surface content for tennis equipment and clothing, a "fashionista" marketing segment may correspond to replacement surface content for luxury clothing, and so on. In this way, the replacement surface content 208 can be personalized for the viewer that requested the video content.

In addition or alternately, the replaceable surface video content 206 can be configured to include the replacement surface content 208 for a predetermined number of different marketing segments. For instance, there may be replacement surface content for marketing segments such as golfers, tennis, fashionistas, and so on. The content replacement module 118 may employ the surface tracking module 202 and the content warping module 204 to incorporate the different replacement surface content before video requests are made, thereby resulting in different versions of the video content for the different marketing segments. The different versions may then simply be delivered to a viewer responsive to a request for the video content and a determination of the viewer's demographic data. It should be appreciated that the replacement surface content 208 the viewer is to be exposed to as part of the video content can be selected in a variety of other ways without departing from the spirit or scope of the techniques described herein. By way of example, a particular advertiser may purchase the rights to have its replacement surface content 208 incorporated for each viewing of a particular video asset after an original broadcast.

In any case, the surface tracking module 202 and the content warping module 204 represent functionality of the content replacement module 118 to replace the replaceable surfaces of the replaceable surface video content 206 with the replacement surface content 208. Specifically, the surface tracking module 202 represents functionality to track replaceable surfaces in the replaceable surface video content 206. To track a surface through a video, the surface tracking module 202 initially receives an indication of the surface to be replaced.

The surface tracking module 202 may receive input from a user, such as a content publisher, that indicates the surface to be replaced, for instance. The user may indicate the surface to be replaced by selecting the surface from a single frame of the replaceable surface video content 206, e.g., the replaceable surface video content 206 may be paused on a frame or otherwise "frozen" to allow a user to mark or otherwise select the surface that is to be replaced with the replacement surface content 208. The user may mark the surface by clicking on the surface, scribbling over the surface (e.g., with a touch scribble input), drawing a shape around the surface (e.g., with a lasso or rectangular selection tool), and so on. It should be appreciated that a user may mark a surface for replacement in a frame of video content using a variety of different techniques without departing from the spirit or scope of the techniques described herein.

In one or more embodiments, the surface tracking module 202 may receive a pattern as an indication of the surface to be replaced. For example, the surface tracking module 202 may receive a logo as an indication of the surface to be replaced. The pattern may be configured as an image file or formatted in another suitable format that allows the pattern to be identified in the replaceable surface video content 206. Returning to the example in which the pattern is a logo, the surface tracking module 202 may use the pattern to search for the logo in a frame of the video content. If the logo is located on a sign of the video content, for instance, the surface tracking module 202 is capable of identifying a frame in which the sign with the logo is captured as well as a location of the sign in the frame. Like the user input to indicate the replaceable surface, the pattern indicative of the replaceable surface may also be supplied by a user that corresponds to a publisher, such as a content network, a content distribution platform, and so forth.

Based on the indication of the surface in the replaceable surface video content 206 that is to be replaced, the surface tracking module 202 tracks the surface throughout the video content. The surface tracking module 202 is capable of tracking the surface across each frame of the replaceable surface video content 206. By "tracking" it is meant that the surface tracking module 202 is capable of identifying whether the replaceable surface is captured in a given frame of the replaceable surface video content 206. In frames that do include the replaceable surface, the surface tracking module 202 is also capable of identifying a location of the replaceable surface. Based on such identifying, the surface tracking module 202 may generate data that indicates which frames of the video content the replaceable surface appears in, and a location of the replaceable surface in each of those frames. In one or more embodiments, the surface tracking module 202 tracks the replaceable surface throughout the replaceable surface video content 206 using motion tracking techniques that are implemented using scripting.

Based on the surface tracking, the content replacement module 118 replaces the tracked surface with the replacement surface content 208, e.g., the replacement surface content 208 selected for the viewer. To do so, the content replacement module 118 incorporates the replacement surface content 208 into the frames of the replaceable surface video content 206. In particular, the replacement surface content 208 is incorporated into the frames of the replaceable surface video content 206 at locations where the replaceable surface is located, according to the motion tracking.

When the replacement surface content 208 is incorporated based solely on the motion tracking, the incorporated content may appear to shake when the video content is played back. This is an undesirable result, however. The content warping module 204 is capable of warping pixels of the replacement surface content 208. The content warping module 204 is also capable of warping pixels of a video content frame around where the replacement surface content 208 is incorporated. In so doing, the content warping module 204 reduces or eliminates "shaking" of the incorporated replacement surface content 208. Accordingly, the content warping module 204 applies warping stabilization techniques to remove aberrant motion of the incorporated replacement surface content 208. Due to application of the warping stabilization techniques, the incorporated replacement surface content 208 does not appear to shake between frames. The "warping" can involve stretching portions of the incorporated replacement surface content 208, or portions of the frame in which incorporated. Warping can also involve compressing portions of the incorporated content or frame, blending portions, and so on. In one or more embodiments, the content warping module 204 stabilizes the incorporated content using warping techniques that are implemented using scripting.

The content replacement module 118 is configured to generate the replaced-surface content 114 by incorporating the replacement surface content 208 into the replaceable surface video content 206, e.g., utilizing the surface tracking and the content warping discussed above in reference to the surface tracking module 202 and the content warping module 204. The replaced-surface video content 114 thus includes the replaced surfaces. Consequently, when users view the replaced-surface video content 114 they are exposed to the replacement surface content 208 rather than the surface that appeared in the replaceable surface video content 206. The replaced-surface video content 114 can be communicated to the computing device 102 for viewing by a user, e.g., communicated to the computing device 102 directly from the surface replacement service 106 or communicated back to the content distributor 104, which then communicates the replaced-surface video content 114 to the computing device 102.

Figure 3:
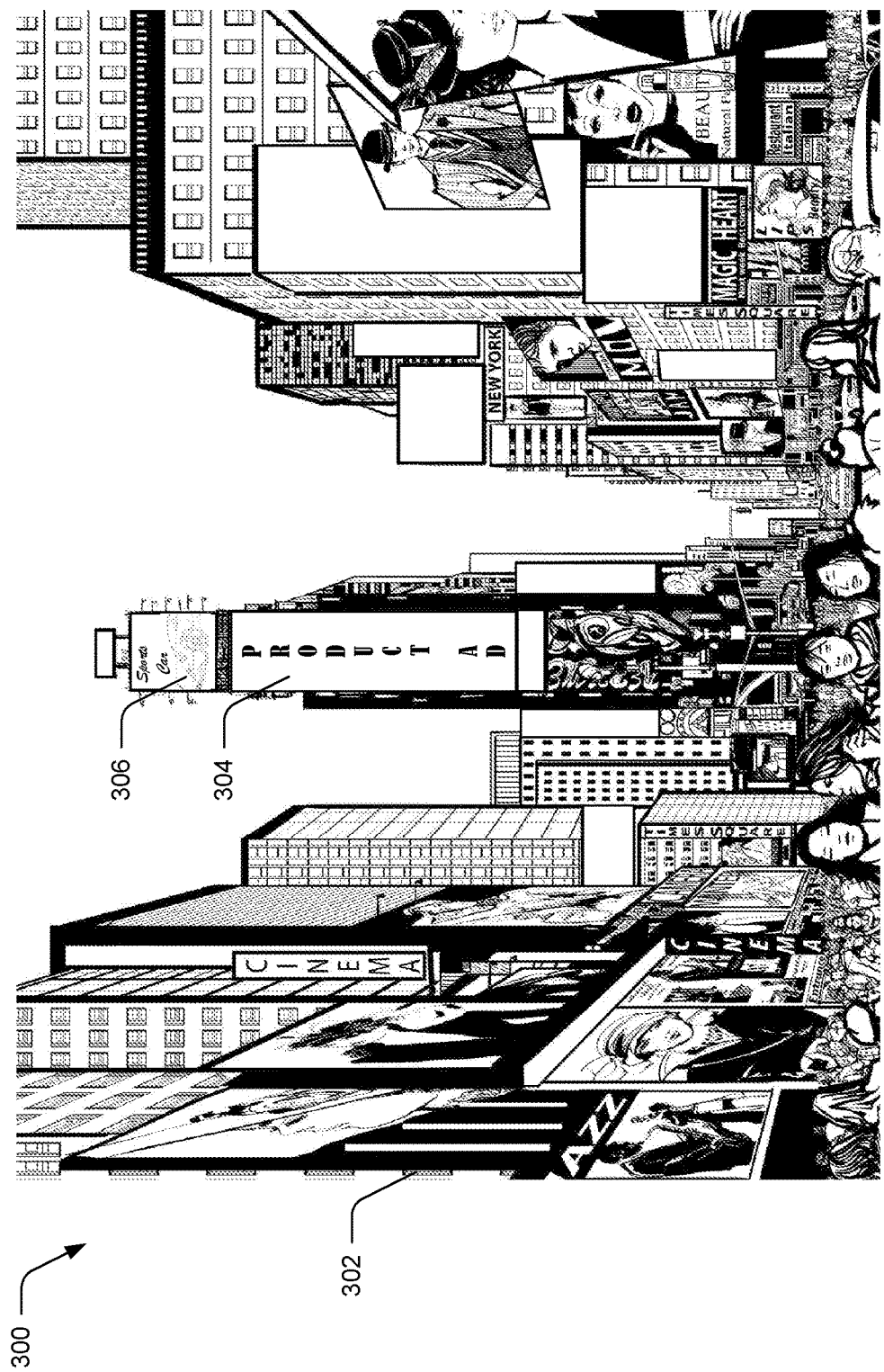
FIG. 3 is an example embodiment showing a frame of video content in which surfaces have content that is replaceable with replacement content.

FIG. 3 depicts an example embodiment, generally at 300, showing a frame of video content in which surfaces have content that is replaceable with replacement content. The illustrated example 300 includes a frame 302 of video. The frame 302 may correspond to a frame of the replaceable surface video content 206, for example. In this particular example, the frame 302 is depicted capturing Times Square in New York City. Thus, the replaceable surface video content 206 may be a movie, television show, news broadcast, and so on, that includes at least one video clip of Times Square. The frame 302 is depicted having several surfaces that may be replaced with the replacement surface content 208 using the techniques described herein. Surfaces 304, 306 are examples of the surfaces that may be replaced with the replacement surface content 208, for example.

As discussed above, an indication of a surface to be replaced may be received to replace the indicated surface with the replacement surface content 208. With reference to the illustrated example 300, a user (e.g., a publisher) may indicate that surface 304 is to be replaced with the replacement surface content 208. By way of example, the frame 302 may be displayed to the user via a user interface and allow the user to select the surface 304 for replacement. The user may select the surface 304 by clicking/tapping on the surface 304, drawing a scribble input, drawing a shape around the surface 304 to select it, and so forth. Alternately, the user may provide a file indicative of the surface 304 to select the surface. By way of example, the user may provide a pattern indicative of the surface 304, e.g., the pattern may be an image file indicative of the surface 304, such as including the words "PRODUCT AD" arranged vertically.

Regardless of how an indication of the surface 304 is obtained, the content replacement module 118 may employ the surface tracking module 202 to track the surface 304 throughout the replaceable surface video content 206. Using motion tracking techniques, the surface tracking module 202 may determine which frames of the replaceable surface video content 206 include the surface 304. For example, the surface tracking module 202 is capable of determining that the frame 302 includes the surface 304. The surface tracking module 202 may also determine a location of the surface 304 in each of the frames determined to include the surface 304. The location may be specified, for instance, in pixel coordinates that define a portion of the frame 302 corresponding to the surface 304. Based on tracking the surface 304 across the replaceable surface video content 206, the content replaces the surface 304 with the replacement surface content 208.

Figure 4:
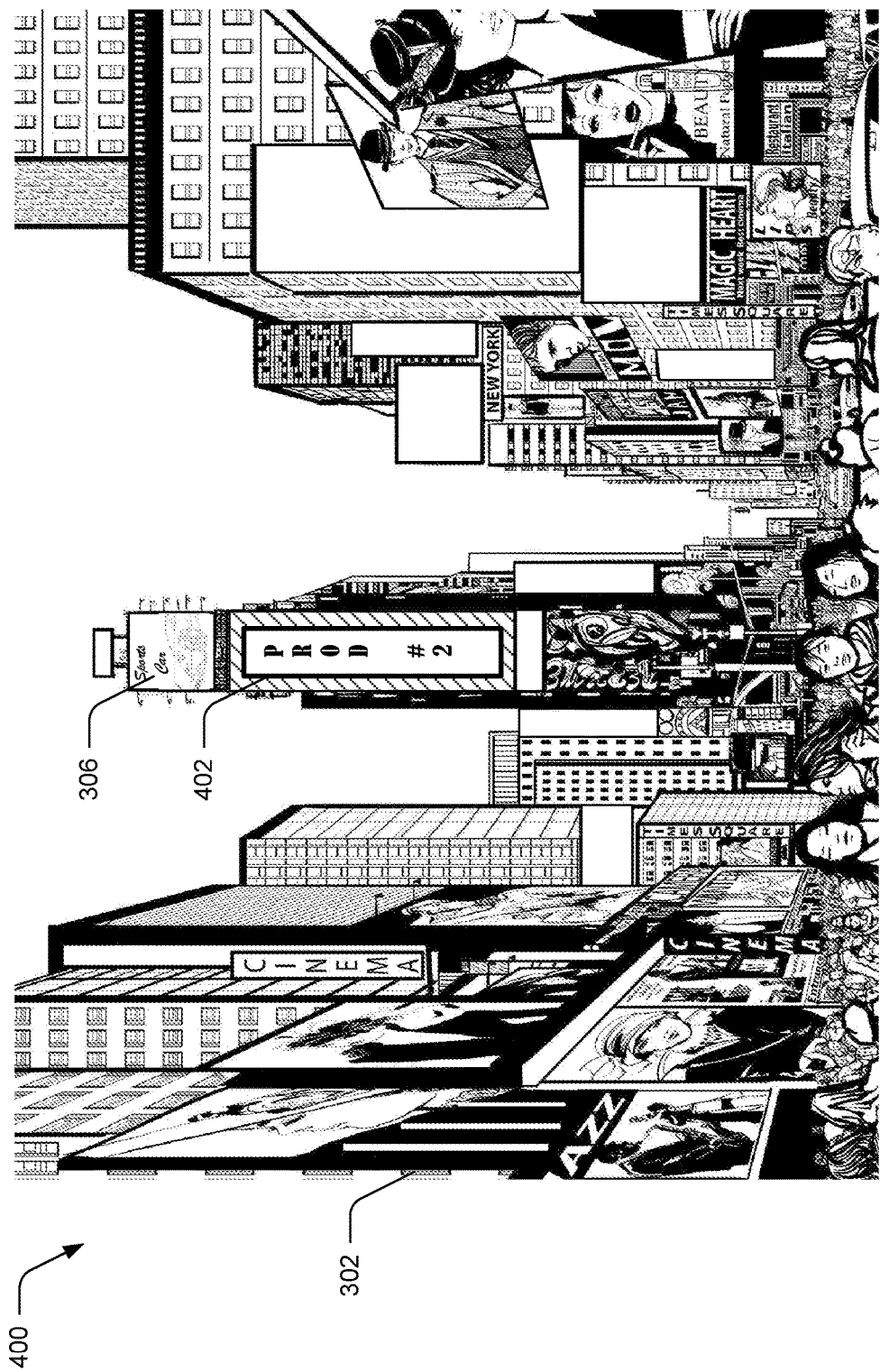
FIG. 4 is an example embodiment showing the frame, but with the content of the surfaces having been replaced with replacement content.

FIG. 4 depicts an example embodiment, generally at 400, showing the frame, but with the content of the surfaces having been replaced with replacement content. The illustrated example 400 includes the frame 302 of video from FIG. 3. However, the surface 304 has been replaced in the illustrated example 400. In particular, FIG. 4 depicts that the surface 304 has been replaced with replacement surface 402. The replacement surface 402 represents an example of the replacement surface content 208. By applying the techniques descried herein, the content replacement module 118 may incorporate the replacement surface 402 into the frames of the replaceable surface video content 206 in which the surface 304 is included. The surface 306 is included in FIGS. 3-4 to indicate a surface that is capable of being replaced with replacement surface content 208, but that is not selected for replacement, and thus not replaced. Accordingly, surface 306 remains the same in both FIGS. 3-4.

The frame 302, as illustrated in FIG. 4, may correspond to a frame of the replaced-surface video content 114. This is because in FIG. 4 the surface 304 has been replaced with the replacement surface 402. Prior to generating the replaced-surface video content 114, the content replacement module 118 may utilize the content warping module 204 to eliminate shaking that results from incorporating the replacement surface 402 into the replaceable surface video content 206. By eliminating the shaking of the replacement surface 402 it may appear as if the replacement surface 402 is part of the scene. With reference to the illustrated examples 300, 400, the replacement surface 402 may appear as if it is a sign actually displayed in Times Square.

Accordingly, the techniques described herein can be used to replace objects (e.g., surfaces) appearing in video content with replacement content. This allows users, such as content publishers and advertisers, to replace signs that are actually part of a scene captured in video content with different content, such as different advertisements. Further, this provides additional revenue opportunities for content distributors. For instance, the video content may initially be broadcast with the objects (e.g., signs) as they are captured. However, some of the replaceable objects may be replaced with other content (e.g., advertising content) when the video is later viewed, e.g., rebroadcasts, requests for the video on-demand, and so on. Furthermore, by incorporating the advertisements into the actual content, rather than inserting commercial breaks, viewers can be exposed to the advertisements without interruption of their viewing experience.

In addition to the viewing experience related advantages, using the surface replacement service 106 to incorporate the replacement content into the video content, instead of performing the incorporation on the client side (e.g., at the computing device 102), offloads the computing burden from the computing device 102. This way, client devices (e.g., the computing device 102) may be configured without expensive hardware and processing equipment used for such incorporation. This can have the effect of reducing an overall cost of client devices that are used to ultimately consume the replaced-surface video content 114.

Having discussed example details of the techniques for replacing content of a surface in video, consider now some example procedures to illustrate additional aspects of the techniques.

Example Procedures

This section describes example procedures for replacing content of a surface in video in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as example surface replacement service 106 of FIGS. 1-2 that makes use of a content replacement module 118.

Figure 5:
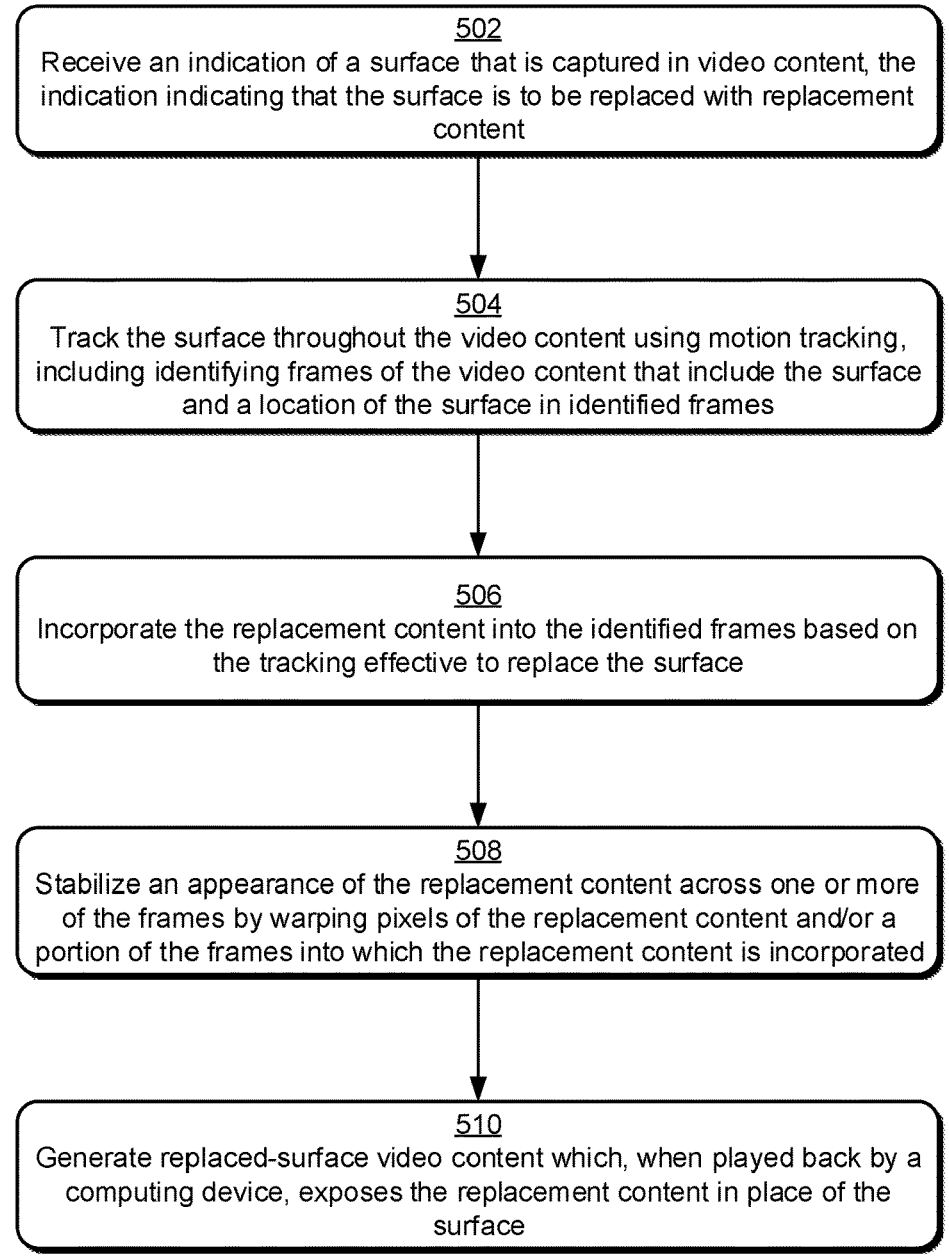
FIG. 5 is a flow diagram depicting an example procedure in accordance with one or more embodiments.

FIG. 5 depicts an example procedure 500 in which a surface in one or more scenes of video content is replaced with replacement content using motion tracking and content warping. An indication is received of a surface that is captured in the video content (block 502). In accordance with the principles discussed herein, the indication indicates that the surface is to be replaced with replacement content. For example, the content replacement module 118 receives an indication of a surface to replace in the replaceable surface video content 206.

As discussed in more detail above, the indication of the surface may be input by a user (e.g., a content publisher) to select the surface from a frame of the replaceable surface video content 206. In this scenario, the user input may be received through a user interface that displays a frame of the replaceable surface video content 206. The user interface may allow the user to select a portion of the frame corresponding to the surface, e.g., by clicking or tapping on the portion, providing a scribble input over the portion, drawing a shape around the portion, and so forth. In addition or alternately, the indication of the surface may be a pattern provided by a user (e.g., a publisher). The content replacement module 118 uses the pattern to search for one or more surfaces in the replaceable surface video content 206 that correspond to the pattern. Regardless of how the indication is made, the indication is effective to indicate a surface that is to be replaced with the replacement surface content 208. With reference to FIGS. 3-4, for instance, an indication of the surface 304 may be received that indicates the surface 304 is to be replaced.

The surface is tracked throughout the video using motion tracking (block 504). In accordance with the principles discussed herein, the tracking includes identifying frames of the video content that include the surface. The tracking also includes determining a location of the surface in the identified frames. For example, the surface tracking module 202 tracks the surface indicated at block 502 using motion tracking. The surface tracking module 202 uses motion tracking techniques implemented with scripting to track the surface through the replaceable surface video content 206. Continuing with the example in which the surface 304 is indicated for replacement, the surface tracking module 202 uses motion tracking techniques to identify which frames of the replaceable surface video content 206 include the surface 304. The surface tracking module 202 also determines a location of the surface 304 in the frames in which it is included.

Based on the tracking, the replacement content is incorporated into the identified frames effective to replace the surface (block 506). For example, based on tracking the surface 304 at block 504, the content replacement module 118 incorporates the replacement surface content 208 into the replaceable surface video content 206. With reference again to the examples in FIGS. 3-4, the content replacement module 118 incorporates the replacement surface 402 (which is an example of the replacement surface content 208) into the replaceable surface video content 206. In particular, the content replacement module 118 incorporates the replacement surface 402 into the frames of the replaceable surface video content 206 (such as the frame 302) to replace the surface 304.

An appearance of the replacement content is stabilized across one or more of the frames into which the replacement content is incorporated (block 508). In accordance with the principles discussed herein, the appearance of the replacement content is stabilized by warping pixels of at least one of a portion of the replacement content or a portion of the frames into which the replacement content is incorporated. For example, the content warping module 204 stabilizes an appearance of the replacement surface 402 across frames of the video content using one or more content warping techniques. The content warping module 204 may use content warping techniques implemented with scripting, for example. In the particular example of FIGS. 3-4, the content warping module 204 uses content warping techniques to warp pixels of at least one of the replacement surface 402 or the frame 302. By doing so, an appearance of the replacement surface 402 to shake during playback is reduced to be imperceptible to the human eye or eliminated.

Replaced-surface video content is generated (block 510). In accordance with the principles discussed herein, the replaced-surface video content, when played back by a computing device, exposes the replacement content in place of the surface. For example, based on the tracking at block 504, the incorporating at block 506, and the stabilizing at block 508, the content replacement module 118 generates the replaced-surface video content 114. The content replacement module 118 may render the replaced-surface video content 114 to generate a video file, such as an MP4, or the like. Consequently, when the replaced-surface video content 114 is played back by the computing device 102, the replacement surface 402 is exposed in place of the surface 304.

Figure 6:
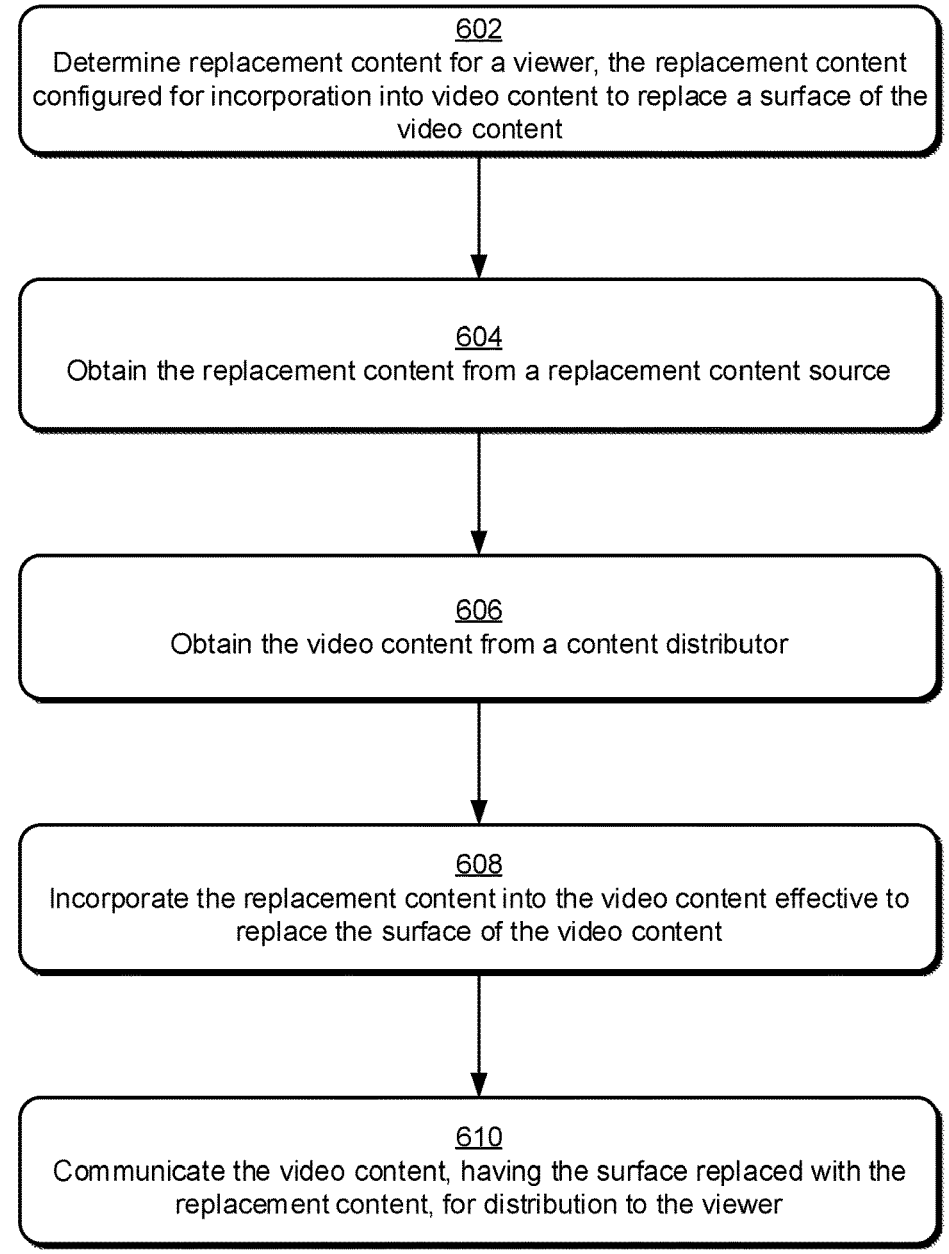
FIG. 6 is a flow diagram depicting another example procedure in accordance with one or more embodiments.

FIG. 6 depicts an example procedure 600 in which replacement content is selected for a video content viewer and in which video content having a surface replaced with the replacement content is distributed to the viewer.

The replacement content is determined for the viewer (block 602). In accordance with the principles discussed herein, the replacement content is configured for incorporation into the video content to replace an indicated surface appearing in at least one scene of the video content. For example, a particular content item (e.g., a particular advertisement) is determined as the replacement surface content 208 for a viewer that requested the video content. In one or more embodiments, the content replacement module 118 determines the replacement surface content 208 based on demographic data collected about the user.

The replacement content is obtained from a replacement content source (block 604). For example, the surface replacement service 106 obtains the replacement surface content 208 from an advertisement provider. In one or more embodiments, the surface replacement service 106 obtains a variety of different surface content from a replacement content source, and then determines the replacement content for a viewer from the already-obtained replacement content. In some embodiments, the surface replacement service 106 requests the replacement content from the replacement content source after the determination at block 602, and obtains the replacement content responsive to the request. The video content is obtained from a content distributor (block 606). For example, the surface replacement service 106 obtains the replaceable surface video content 206 from the content distributor 104. As discussed above, the surface replacement service 106 may obtain the replaceable surface video content 206 responsive to viewer requests for the content. The surface replacement service 106 may also obtain the replaceable surface video content 206 before being requested so that the replacement content 208 can be incorporated. In this way, the replaced-surface video content 114 can be maintained so that it is available for delivery with the replacement surface content 208 already incorporated when a request is made.

The replacement content is incorporated into the video content effective to replace the surface of the video content (block 608). For example, the content replacement module 118 utilizes the surface tracking module 202 and the content warping module 204 to replace a surface of the replaceable surface video content 206 with the replacement surface content 208, in the manner discussed in conjunction with FIG. 5. This results in the replaced-surface video content 114.

The video content, having the surface replaced with the replacement content, is communicated for distribution to the viewer (block 610). For example, the surface replacement service 106 communicates the replaced-surface video content 114 to the computing device 102. At the computing device 102, the replaced-surface video content 114 can be played back, e.g., using one of the applications 112 configured as a media player. Rather than communicate the replaced-surface video content 114 directly to the computing device 102 for playback by a viewer, the surface replacement service 106 may instead communicate the replaced-surface video content 114 to the content distributor 104. The content distributor 104 may then communicate the replaced-surface video content 114 to the computing device 102 for playback by a user. In one or more embodiments, the video content is communicated to the computing device 102 via a stream. In at least some of these embodiments, the streaming to the computing device 102 begins before the replacement content is fully incorporated into the video content. As such, some incorporation of the replacement content may occur as the video content is being streamed.

Having described example procedures in accordance with one or more embodiments, consider now an example system and device that can be utilized to implement the various techniques described herein.

Example System and Device

Figure 7:
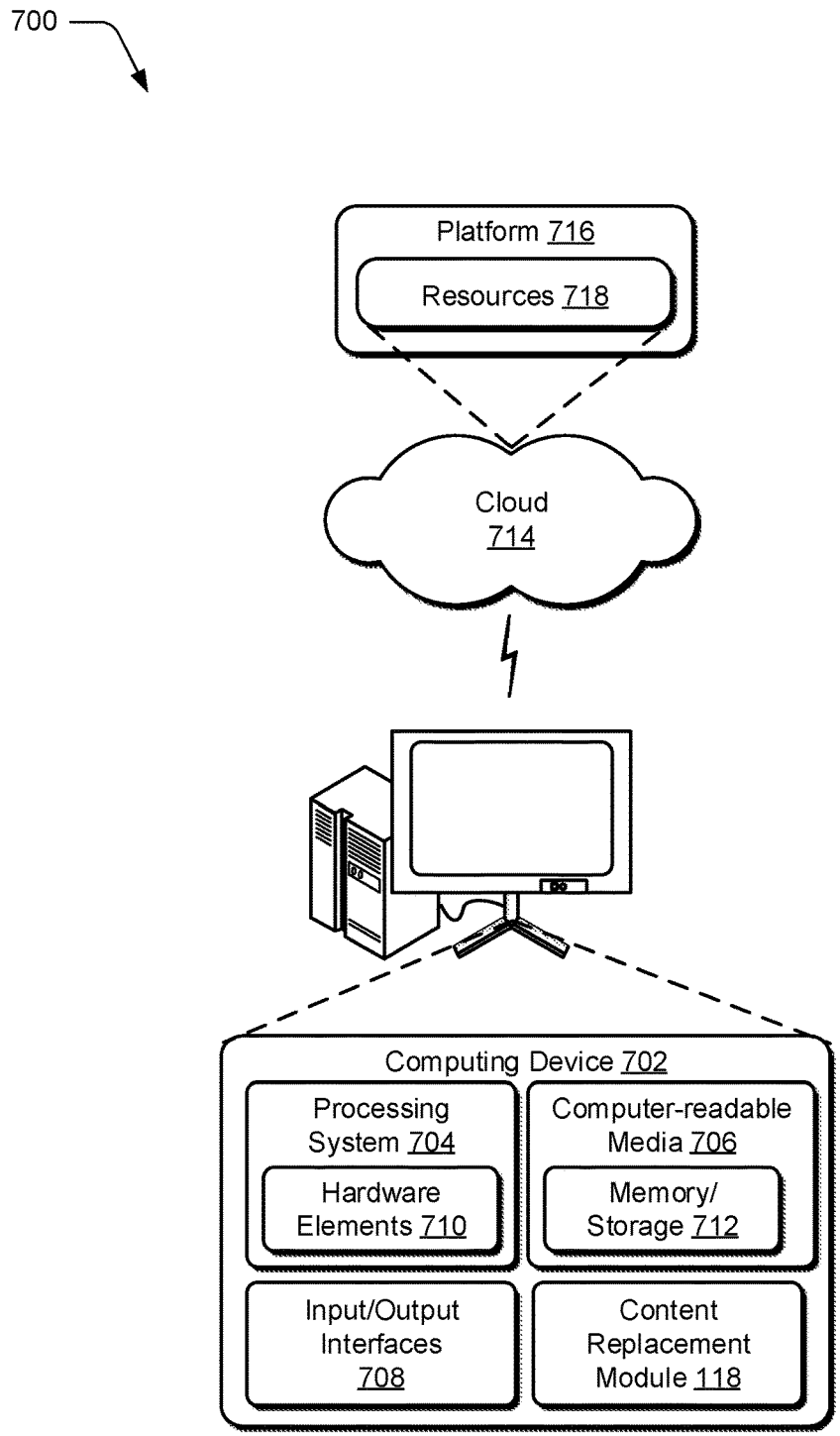

FIG. 7 illustrates an example system generally at 700 that includes an example computing device 702 that is representative of one or more computing systems and/or devices that may implement the various techniques described herein. This is illustrated through inclusion of the content replacement module 118, which operates as described above. The computing device 702 may be, for example, a server of a service provider, a device associated with a client (e.g., a client device), an on-chip system, and/or any other suitable computing device or computing system.

The example computing device 702 includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a server device of a web service to expose viewers of video content to secondary content without disrupting a viewing experience of the viewers, the method comprising:
    receiving, by the server device, an indication of a surface appearing in at least one scene of the video content, the indication indicating that the surface is to be replaced with replacement content, and the indication comprising one of:
        a user selection input to select the surface for replacement from a frame of the video content; or
        a pattern the server device uses to search for the surface in frames of the video content;
    tracking, by the server device, the surface throughout the frames of the video content using motion tracking, including identifying frames that include the surface and locations of the surface in identified frames;
    incorporating, by the server device, the replacement content into the identified frames at identified locations based on the tracking and by the server device replacing pixels of the identified frames at the identified locations with different pixels of an image depicting the replacement content;
    generating, by the server device, replaced-surface video content in accordance with the incorporating, the replaced-surface video content configured to expose the replacement content in place of the surface when played back; and
    communicating, by the server device, the replaced-surface video content for distribution to a viewer device, the communicated replaced-surface video content having the surface replaced in the at least one clip with the replacement content.

2. A method as described in claim 1, wherein the tracking includes identifying both the frames that include the surface and the frames that do not include the surface.

3. A method as described in claim 1, further comprising stabilizing an appearance of the replacement content across at least one of the frames into which the replacement content is incorporated by warping at least one of pixels of the replacement content or pixels of the at least one frame.

4. A method as described in claim 1, further comprising:
    collecting information that describes a viewer that requested the video content; and
    determining the replacement content to incorporate into the video content based on the collected information.

5. A method as described in claim 4, wherein the determining includes determining a market segment for the viewer based on the collected information, the determined replacement content being associated with the determined market segment.

6. A method as described in claim 1, wherein the replacement content comprises advertising content.

7. A method as described in claim 1, wherein the tracking includes searching the frames of the video content to identify the pattern.

8. A method as described in claim 7, further comprising incorporating the replacement content at locations where the pattern is identified in the frames.

9. A method as described in claim 1, wherein the web service is a web-based surface replacement service.

10. A method as described in claim 1, further comprising communicating the replaced-surface video content to a client device for playback by the client device.

11. A method as described in claim 10, wherein the replaced-surface video content is configured for playback by the client device without the client device incorporating the replacement content into the identified frames.

12. A method as described in claim 1, wherein the video content is received by the server device from a content distributor responsive to a viewer request for the video content.

13. A server device to implement a web-based surface replacement service using cloud-based resources for exposing viewers of video content to secondary content without disrupting a viewing experience of the viewers, the server device comprising:
one or more processors; and
computer-readable storage media having stored thereon instructions that are executable by the one or more processors to implement a content replacement module to cause the server device to perform operations comprising:
obtaining the video content from a content distributor;
obtaining replacement content from a replacement content source;
incorporating the replacement content into the video content using the cloud-based resources and by replacing a surface that appears in at least one clip of the video content with the replacement content to generate replaced-surface video content, the surface being replaced by identifying the frames of the video content that include the surface and a location of the surface in the identified frames and by replacing pixels of the identified frames at the identified location with different pixels of an image depicting the replacement content; and
communicating the replaced-surface video content for distribution to a viewer device, the communicated replaced-surface video content having the surface replaced in the at least one clip with the replacement content.

14. A system as described in claim 13, wherein the operations further comprise determining the replacement content to incorporate into the video content based on demographic information of a viewer.

15. A system as described in claim 13, wherein the content replacement module utilizes a script-based motion tracking technique to identify the frames and the location.

16. A system as described in claim 13, wherein the operations further comprise stabilizing an appearance of the replacement content for playback using content warping that adjusts pixels of at least one of the replacement content or the frames into which the replacement content is incorporated.

17. A system as described in claim 16, wherein the content replacement module utilizes script-based content warping to stabilize the appearance of the replacement content.

18. A method implemented by a computing device for reducing distractions to video content viewing that are due to incorporation of advertising content by cloud-based resources of a web service, the method comprising:
requesting, by the computing device, video content from a content distributor;
receiving, by the computing device, a version of the video content in which a surface appearing in at least one scene of the video content has been replaced with advertising content using the cloud-based resources, the surface having been replaced by the cloud-based resources replacing pixels of frames of the video content including the surface with different pixels of an image depicting the advertising content; and
playing back, by the computing device, the version of replaced-surface video content effective to expose a viewer to the advertising content in place of the surface, the exposed advertising content appearing as part of the at least one scene based on the replacement.

19. A method as described in claim 18, further comprising communicating demographic data describing the viewer to the cloud-based resource of the web service, the advertising content used to replace the surface being determined based on the demographic data.

20. A method as described in claim 18, wherein:
the requesting corresponds to a request to stream the video content;
the receiving receives the version of the replaced-surface video content via streaming; and
the surface is replaced with the advertising content during at least a portion of the receiving.

* * * * *